United States Patent
Mosyakov et al.

[11] 3,883,873
[45] May 13, 1975

[54] METHOD OF UNAMBIGUOUS DETECTING THE POSITION OF MOVING OBJECT, ALSO GROUND STATION AND RECEIVER DISPLAY OF RADIO NAVIGATION SYSTEM FOR EFFECTING SAME

[76] Inventors: Evgeny Alexandrovich Mosyakov, Zvezdny bulvar, 1, kv. 28; Jury Vasilievich Rtischev, Sevasto-polsky prospekt, 34, kv. 18; Efim Zakharovich Berer, Volgo-gradsky prospekt, 135, korpus 1, kv. 45; Vladimir Markovich Leus, Novo-Kuzminskaya 16, korpus 1, kv. 129; Viktor Petrovich Lukeev, Polyarnaya ulitsa, 9, korpus 4, kv. 416; Evgeny Markovich Rodionov, Avangardnaya ulitsa, 22/32, kv. 115; Vladimir Lvovich Levitsky, 2 Mosfilmovsky pereulok, 3, kv. 24; Vladimir Surenovich Akopyan, B. Gnezdnikovsky pereulok, 10, kv. 730; Jury Yakovlevich Mindlin, Kolokolnikov pereulok, 12, kv. 29; Evgeny Ivanovich Balashov, Prospekt Vernadskogo, 111, kv. 88; Isaak Efimovich Kinkulkin, Lavrushinsky pereulok, 17, kv. 15; Galina Petrovna Shumakova, Kolomensky proezd, 1/1, korpus 9, kv. 90, all of Moscow; Evgeny Tikhonovich Fedotov, 3 Tsvetochny pereulok, 3, Balashikhinsky raion, poselok Saltykovka; Vladimir Fedorovich Lazarev, ulitsa Butlerova, 10, kv. 247, Moscow, all of U.S.S.R.

[22] Filed: Nov. 1, 1972

[21] Appl. No.: 302,814

[52] U.S. Cl............ 343/103; 343/105 R; 343/112 D
[51] Int. Cl................................................ G01s 1/24
[58] Field of Search......... 343/103 R, 105 R, 112 D

[56] References Cited
UNITED STATES PATENTS

2,651,032  9/1953  Torcheaux et al. ............. 343/105 R
2,924,820  2/1960  Dishal et al. .................... 343/112 D
3,242,492  3/1966  Honore et al. .................. 343/103
3,339,202  8/1967  Earp ................................ 343/112 D
3,725,932  4/1973  Hughes .......................... 343/105 R
3,736,590  5/1973  Lipsey et al. ................... 343/103

*Primary Examiner*—Maynard R. Wilbur
*Assistant Examiner*—T. M. Blum

[57] ABSTRACT

A method for the unambigous defining of the position of a moving object in which the ground stations of a radio-navigation system emit alternately long pulse trains comprised of great number of successive groups of radio pulses with various carrier frequencies and repetition interval, which depends only on the delay time of signal reflected by the ionosphere. The long pulse trains produce an electromagnetic field with predetermined frequency and phase relationships. Also employed is a receiver-display which receives the signals radiated in the form of long pulse trains and those reflected by the ionosphere, performs a search for and separation of radio pulses within each long train and then converts the radio pulses into undamped oscillations having the same intermediate frequency and a duration equal to that of long pulse trains, the relative phases thereof depending on the phase of radiated signals. The receiver-display executes also the measure of difference in phase between the I.F. oscillations within each long train, which are equivalent to the phase of signals at beat frequency of two carrier frequencies. The receiver-display obtains then the measurements of the difference in phase of radio pulses at repetition frequency and difference between said differences in phase of I.F. oscillations — the two being obtained within different long trains — for removing any possible ambiguity and defines accurately the position of a moving object, that is its own position, by using the difference in phase between said I.F. oscillations obtained on one of the carrier frequencies within the various long trains.

10 Claims, 3 Drawing Figures

METHOD OF UNAMBIGUOUS DETECTING THE POSITION OF MOVING OBJECT, ALSO GROUND STATION AND RECEIVER DISPLAY OF RADIO NAVIGATION SYSTEM FOR EFFECTING SAME

The present invention relates to radio navigation systems which enable detecting the position of a moving object, and in particular, to a method for the unambiguously detecting of the position of a moving object. The invention also relates to a ground station and a receiver-display for a radio navigation system relating to the above. This invention also relates to means for determining the position of sea-going vessels.

Methods are known for the unambiguous detecting of the position of a moving object relative to at least three ground stations, employed in familiar radio navigation systems.

In these known systems is employed a separation of the ground ray from the space ray. The removing of ambiguity of phase measurements in a carrier frequency is effected by using envelopes of pulses, while the location is determined according to the phase of one of the first high-frequency cycles.

In the Loran-C system, the repetition period of pulse trains is defined by distances between ground stations and sequential emission by each station and is rather large. Therefore, when the signals are searched the noise immunity is reduced.

Another disadvantage is that the high duration of the repetition period, as compared to the carrier frequency of the radio pulse, decreases the possibility of lessening ambiguity.

The latter drawback is especially evident when the carrier frequency is increased in known systems operating in the middle-wave range the reliability of ambiguity removal is rather small.

Known in the art are radio navigation systems wherein in order to increase the reliability of ambiguity removing two pulses with various carrier frequencies are used. However, the pulse repetition period is still large, while the search of the signals in a wide-band receiver-display is hampered by interferences on adjacent frequencies.

It is possible to remove ambiguity when emitting auxiliary frequencies, but, nevertheless, since unattenuated oscillations are radiated, especially at night, the use of such radio navigation system is limited due to reflection of the wave.

Patent Specification No. 1,027,303 (Great Britain) discloses a system providing for the unambiguous detecting of the position of a moving object relative to at least three ground stations of a radio navigation system, one of which is the main station, based on alternate transmission by these stations of trains of pulses with various carrier frequencies in order to produce an electromagnetic field with predetermined frequency and phase relationships and reception by a receiver-display of these signals for further dividing the signals propagated over the earth surface from those reflected by the ionosphere, and measuring signal phases of one station relative to those of another station. Then, based on the phase difference of one of the carrier frequencies, the location of a moving object is defined, whereas based of the results of phase comparison on the beat the unambiguous position of a moving object is determined in the working zone.

Also known is a station for a radio navigation system effecting a method of unambiguous determination of a position of a moving object, wherein a signal derived from a reference generator is supplied by means of adjusting phase shifter to the first forming unit of carriers and auxiliary frequencies the outputs thereof being connected to a transmitter via modulators, the output of the adjusting phase shifter being likewise connected, via the reference phase shifter, to the input of the second carrier and auxiliary frequencies forming unit, the outputs thereof being connected, via modulators to the first input of the phase discriminator, the second input of the latter being connected to the antenna via series-connected wide-band filters and gates, while the output of the phase discriminator is connected to the adjusting phase shifter.

Known in the art also is a receiver-display of a radio navigation system for a method of unambiguous determination of the position of a moving object, wherein a signal from the antenna is transmitted to parallel circuits comprising series-connected gates and wide-band filters, the output of which is connected to the inputs of phase discriminators, whereas the signal derived from the reference generator is supplied to the inputs of matching phase shifters. The outputs of the phase discriminators are connected to the adjusting phase shifters.

Nevertheless, the stations employed in this system radiate the pulse trains in succession, one after another, resulting in an increase of the repetition interval in the same way as in the Loran system. Moreover, search and measurement of the phases of signals are effected over a wide range. All these features require increasing of the peak power of transmitter needed for improving noise immunity.

Another drawback is that in the ground station and in the receiver-display are generated carrier frequencies, which are also used for measuring the signal phases emitted by other stations, which in case of direct amplification receivers makes difficult the provision of high sensitivity and hinders the operation with low input levels.

Moreover, high absolute phase stability of a plurality of receiving, transmitting and forming channels needed for producing the signals with predetermined frequency and phase relationships is hardly realizable. These drawbacks interfer with accurate and reliable position finding.

It is an aim of this invention to obviate the aforementioned drawbacks.

An important object of this invention is to provide a method for the unambiguous defining of the position of a moving object, also, a ground station and a receiver-display for a radio navigation system effecting the same, which insures the separation of a surface signal carrying useful information about the position of an object with respect to the ground stations, and increases the accuracy and reliability of defining the position under conditions of small radiating power, the requirements to effect absolute phase stability of radio channels being lowered.

This object is attained in that according to a method for the unambiguous determination of the position of a moving object relative to at least three stationary ground stations, one of which is the main station, based on alternate emission by these stations pulse trains of various carrier frequencies in order to produce an electromagnetic field with predetermined frequency phase relationships, and on reception by the receiver-display of these signals for further dividing the signals propagating over the earth surface from those reflected by the ionosphere and measuring the phases of signals radiated by one station relative to those of another station, the difference in phases of one of the carrier frequency being used to ascertain the location of a moving object, while the results of comparison of signal phases on beat frequencies being used to detect the unambiguous position of a moving object in the working zone of a radio navigation system, wherein, according to the invention, the ground stations transmit alternately long trains of pulses comprised of successive groups of radio pulses of various carrier frequencies, while the main station emits additionally a synchronizing signal which defines the sequence of emission of pulse trains in the general emission cycle, the receiver-display determines the sequence of radiation of radiation of long pulse trains by the ground stations using the synchronizing signal, searches the pulses within each long train and measures the phases of signals on one of the carrier frequencies in order to define accurately the position of a moving object, whereas the removal of any residual ambiguity is effected on beat frequencies and on the pulse repetition frequency.

This problem is also solved in that the ground station of the radio navigation system, wherein the signal derived from a reference generator via the adjusting phase shifter is applied to the input of auxiliary frequencies forming unit, the outputs thereof being connected to the transmitter of emitted signal via modulators, the output of the adjusting phase shifter being connected to the reference phase shifter, belonging to the receiving channel of a ground station and connected to the first input of the phase discriminator, across the second input of which is applied a signal derived from the receiver antenna via gating stages and wide-band filters, while the output being connected to the adjusting phase shifter, and according to the invention, is provided with narrow-band filters which transform the radio pulses into a continuous signal having a duration equal to that of the pulse train, the inputs thereof being connected to the outputs of the gating stages, while the outputs are connected via electronic keys to the phase discriminator, the inputs of the wide-band filters being connected to the transmitter antenna, while the outputs are connected to the inputs of the gatings stages.

The receiving channel of the ground station can be equipped with phase shifter, reference frequency forming unit, modulator and reference pulse forming unit, which are arranged in series, the output of the adjusting phase shifter being connected to the input of the phase shifter of the receiving channel and through auxiliary adjusting phase shifters, each connected to relevant modulator, is connected to the auxiliary frequency forming unit, the output of the reference pulse forming unit being connected to the inputs of the wide-band filters, connected to converters of diverse input frequencies into one frequency, the outputs thereof being connected in parallel through the keys and linked with the gating stages, the first input of the phase discriminator being connected to the output of one of the narrow-band filters, while its second input is connected through electronic keys to the output of another narrow-band filter and to the reference and adjusting phase shifters, while its output is connected to adjusting phase shifters and to the phase shifter of the receiving channel.

Further, this object is attained in a receiver-display of a radio navigation system, wherein the signal derived from the receiving antenna is applied to two parallel circuits, each comprising series-connected gating stages and wide-band filters, the outputs thereof being connected to the inputs of relevant phase discriminator, while the signal derived from the reference generator is supplied to the inputs of the adjusting phase shifters, connected to the phase discriminators, wherein according to the invention converters of diverse frequencies into one frequency are provided, the number of which being equal to the number of the carrier frequencies of the system and the inputs of which are connected to the outputs of the wide-band filters, connected to the receiving antenna, the output of one converter being connected to the first gating stage, whilst the output of each of the remaining converters being connected to relevant electronic keys, all the keys being connected to the gating stage of the second circuit, narrow-band filters included in each circuit, each being connected to the output of the gating stage, and the output of the first filter being connected to the input of the auxiliary phase shifter, a phase difference display unit comprising phase shifters, connected to the output of the auxiliary phase shifter, and an auxiliary frequency forming unit, the input of which is connected to the output of the adjusting phase shifter, while the output is connected to converters of diverse input frequencies into one frequency, the first input of the phase discriminator associated with the second circuit, being connected to the output of the narrow-band filter of the same circuit, whereas its second input and the output are connected to the auxiliary phase shifters and to the phase shifters of the phase difference display unit, the second input connection being effected through electronic keys.

The receiver-display can be provided with an auxiliary gating stage connected to the output of the first converter of diverse input frequencies into one frequency, an auxiliary narrow band filter and a modulator, arranged in series and connected to the output of this auxiliary gating stage, a summator, one input of which being connected to the modulator output, whilst the other input is connected, via the second modulator, to the output of the first parallel circuit, whilst the output, to the amplitude detector connected to the auxiliary phase shifter and phase difference dislay unit, the second output of the frequency forming unit being connected to the input of the auxiliary phase shifter and to the input of the phase difference display unit, the gating stages being connected via electronic keys to the output of the auxiliary phase shifter and to the second output of the phase difference display unit.

Another embodiment of the receiver display is possible, wherein two-channel automatic analyzer of phase shifters operation is provided, the inputs thereof being connected to the outputs of the narrow-band filters of parallel circuits and to the outputs of the phase discriminator and/or the amplitude detector, and an automatic switching unit of the modes of operation, the input of which is connected to the output of the two-channel automatic analyzer.

It is preferable that the phase difference display unit is made as phase shifters connected to each other via a reducer.

Such an embodiment provides for substantial increase in the accuracy the reliability of the position finding of a moving object with respect to the ground stations.

The nature of the invention will be clear from the following description taken in conjunction with the accompanying drawings, wherein:

FIGS. 1 a, b and c shows a schematic diagram of emission by ground stations, according to the invention;

The method for the unambiguous determination of the position of a moving object relative to three stationary ground stations of a radio navigation system, the first station being the main and the two remaining stations being auxiliary, is based on alternate emission by these stations of trains of radio pulses having various carrier frequencies in order to produce an electromagnetic field with predetermined frequency and phase relationships. This method consists in that the main station radiates long pulse trains during time intervals $T_1$ and $T_3$ (FIG. 1a), equal to 220 m.sec., the first auxiliary station emits similar long pulse train during time interval $T_2$, also equal to 220 m.sec. and separated from the trains emitted during the periods of time $T_1$ and $T_3$ by intervals $T_{01}$ and $T_{02}$ equal to 30 m.sec. The second auxiliary station emits similar long pulse pulse train during a period of time $T_4$ equal to 220 m.sec. separated from the pulse trains of the periods of time $T_3$ and $T_4$ by intervals $T_{03}$ and $T_{04}$ equal to 30 m. sec.

Total time T of emission of the pulse trains by all the stations of the system is equal to 1 sec, which constitutes the operating cycle of the stations and is repeated periodically.

Each long pulse train emitted during the periods of time $T_1$, $T_2$, $T_3$ and $T_4$ consists of successive groups of radio pulses with frequencies $f_1, f_2, f_3, f_4$ (FIG. 1b), the duration of each pulse $t_1$ is about 150µsec; the pulses are passed, one after another in such a way that a radio pulse with a frequency $f_3$ follows a radio pulse with frequency $f_1$, a radio pulse with a frequency $f_4$ follows a radio pulse with a frequency $f_3$ an interval $2t_i$, a radio pulse with a frequency $f_2$ follows a radio pulse with a frequency $f_4$, and again, a radio pulse with a frequency $f_1$ follows a radio pulse with a frequency $f_2$ after an interval $2t_i$.

The time of emission of radio pulses with one carrier frequency, such as frequency $f_1$ constitutes the pulse repetition time $t_1$ equal approximately to 1.2 m.sec., multiple to carrier frequencies, whilst the pulse trains with the repetition time $t$ are passed during the station emission time equal to 220 m. sec.

Besides, during the emission of a long pulse train $T_1$, the main station radiates additionally a synchronizing signal in the form of a successive radio pulses of a duration $2t_i$ and frequency $f_5$ (FIG. 1c), which fill the intervals in the emission between the radio pulses with frequencies $f_3$ and $f_4$ and those between the radio pulses with frequencies $f_2$ and $f_1$.

The radio navigation system executing the hereinabove described method of unambiguous position location of a moving object comprises ground stations spaced at some distance from each other and a plurality of receiver-displays disposed on the moving objects.

Further the invention will be described by way of example of determining the position of a marine vessel relative to the shores whereon the ground stations are located.

Each ground station of a radio navigation system comprises a reference generator 1 (FIG. 2) connected with a key 2 and with a adjusting phase shifter 3, several circuits connected in parallel, the number of which is taken depending on the number of carrier frequencies of the system and each consisting of a adjusting phase shifter 4 (5, 6 and 7) with a modulator 8 (9, 10 and 11) connected to the latter, and a frequency converter 12 (13, 14 and 15). A common point 16 of said circuits is connected via a key 17 to the output of the adjusting phase shifter 3, whilst a common point 18 is connected via an amplifier 19 to a transmitter 20 equipped with a receiving-transmitting antenna 20. The converters 12 – 15 and the amplifier 19 form a carrier frequency forming unit.

Figure 2:
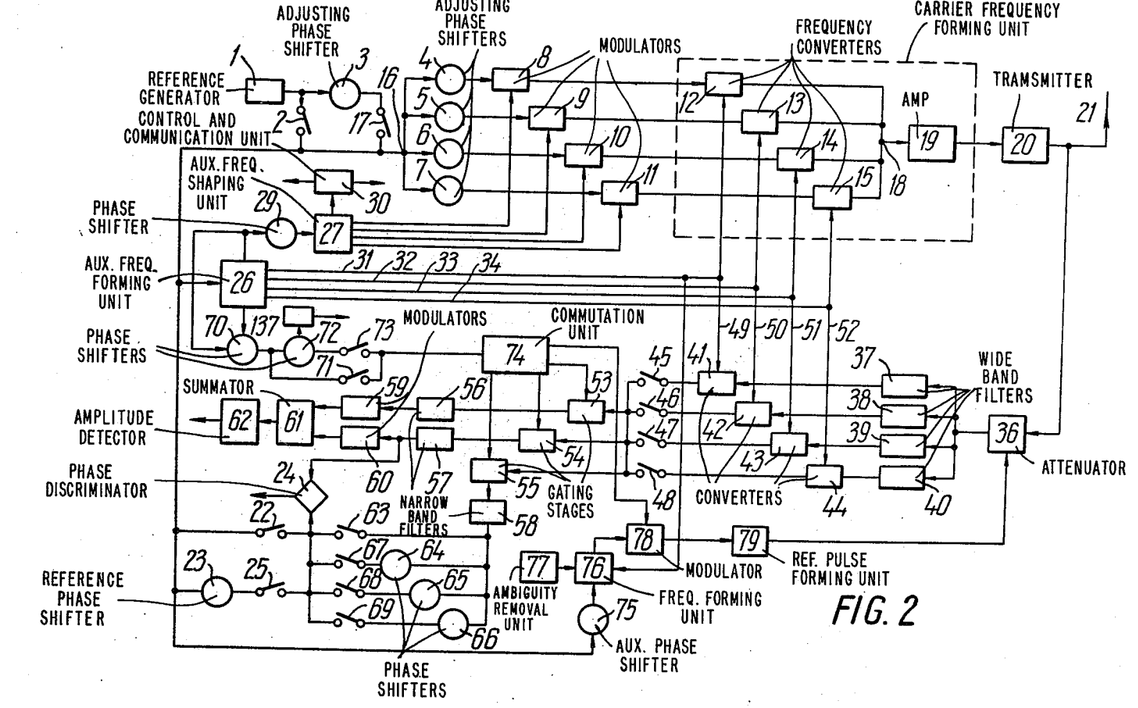
FIG. 2 is a block diagram of the ground station, according to the invention.

The outputs of keys 2 and 17 are combined into one point and connected to the input of a reference phase shifter 23 and to the input of a key 22.

The station comprises also a phase discriminator 24, whose one input is connected to the output of the key 22, combined with the output of a key 25 connected to the phase shifter 23.

Besides, the station has a auxiliary frequency forming unit 26 and a auxiliary frequency shaping unit 27. The input of the former unit 26 is connected to outputs of the keys 2 and 17, while its first output 28 is connected to the input of a phase shifter 29, which in turn is connected to the input of the unit 27. One of outputs of the latter unit 27 is connected to a control and commutation unit 30 of the stations. Remaining outputs 31, 32, 33 and 34 of the unit 26 are connected with the second inputs of the converters 12 – 15 respectively.

The receiving channel of the ground station comprises the same number of parallel circuits as the transmitting channel. A common input point 35 of these circuits is connected to an antenna, a wide-band filter 37 (38, 39 and 40), a converter 41 (42,43 and 44) of various input frequencies into one frequency and an electronic key 45 (46,47 and 48), which are arranged in series. The inputs 50, 49, 51 and 52 of the unit 26.

The common point of the keys 45–48 is connected to gating stages 53, 54 and 55, the outputs thereof being connected to the inputs of relevant narrow-band filters 56, 57 and 58.

The filters 56 and 57 are connected, via modulators 59 and 60, to the inputs of a summator 61 connected with an amplitude detector 62. The output of the filter 58 is connected to the input of the key 63 and to the inputs of phase shifters 64, 65 and 66, which in turn are connected, via electronic keys 67, 68 and 69 to the second input of the phase discriminator 24.

Moreover, the station is provided with a phase shifter 70 disposed at the output 28 of the unit 26, its output being connected, via either an electronic key 71 or a phase shifter 72 and an electronic key 73, to the input of the second commutation unit 74, the outputs thereof being in turn connected to the second inputs of the gates 53-55. The second output of phase shifter 72 is connected with the reference phase shifter 74.

According to the invention, the station is provided with an auxiliary phase shifter 75 whereto is connected a reference frequency forming unit 76, the second input thereof being connected to an ambiguity removal unit 77, whilst the third input is connected to the output 31 of the unit 26.

The output of the unit 76 is connected, via a modulator 78, to the input of a reference pulse forming unit 79, the output thereof being connected to the second input of the unit 36. The modulator 78 is connected also with the commutation unit 74.

Figure 3:
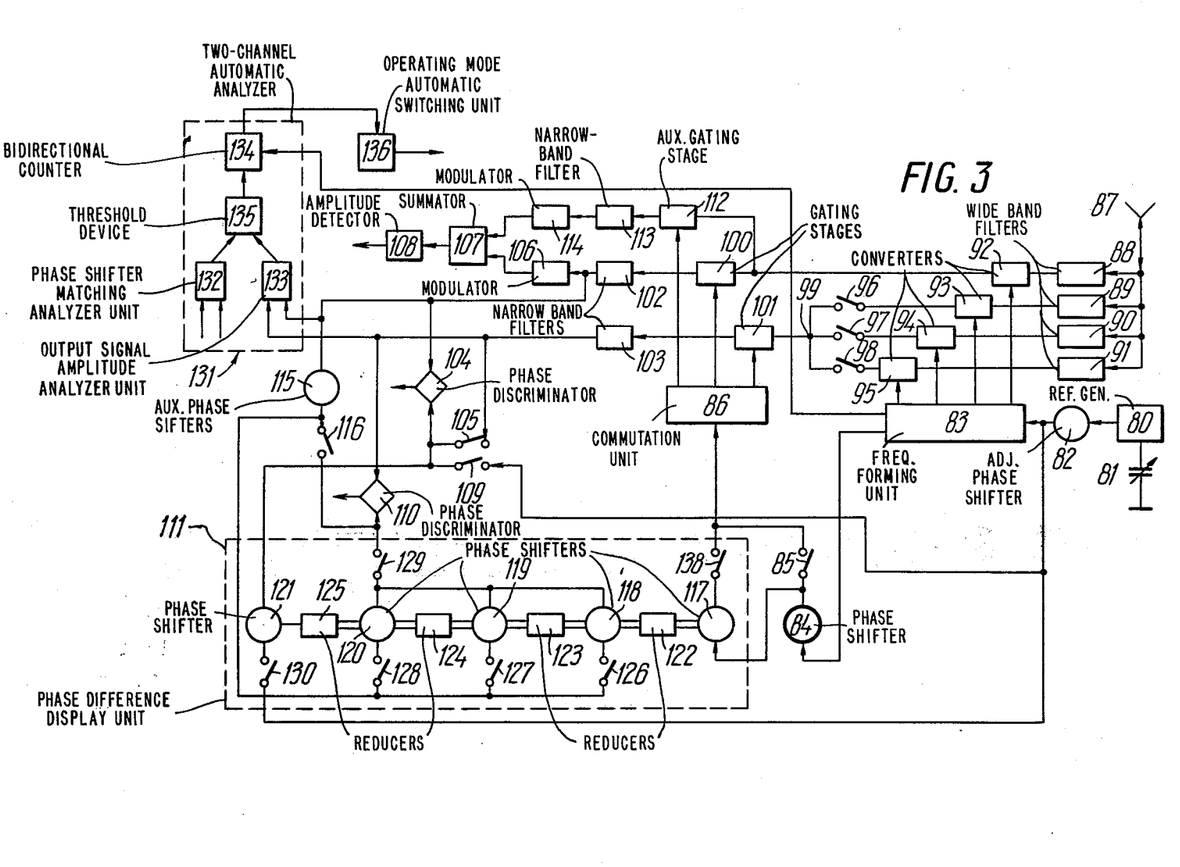
FIG. 3 is a block diagram of the receiver-display, according to the invention.

The receiver-display of the radio navigation system, whose circuit diagram is presented in FIG. 3, comprises a reference generator 80 with a variable capacitor 81, the output thereof being connected to the input of a adjusting phase shifter 82 and a frequency forming unit 83, the output thereof being connected to a phase shifter 84 via a key 85 connected to a commutation unit 86.

The receiving antenna 87 of the receiver-diplay is connected to the inputs of wide-band filters 88, 89, 90 and 91 each connected with relevant converter 92, 93, 94, and 95 which converts various input frequencies into one frequency. The second inputs of these converters 92–95 are connected with the outputs of the unit 83, converters 93, 94 and 95 being connected to the inputs of keys 96, 97 and 98, the outputs thereof being combined into a common point 99. The output of the converter 92 is connected to the input of gating stage 100, while the common point 99 is connected to the gating stage 101.

Besides, each circuit comprises a narrow-band filter 102 (or 103), the outputs thereof being connected with a phase discriminator 104, the output of the filter 102 being connected directly, while the output of the filter 103 via the key 105. The output of the filter 102 is additionally connected with an amplitude detector 108 via a modulator 106 and a summator 107. To the input of the discriminator 104 is also connected, via a key 109, the output of the phase shifter 82. The output of the filter 103 is connected with the input of the second phase discriminator 110, to the second input of which is connected a phase difference display unit 111.

According to the invention, the receiver-display has an auxiliary gating stage 112, connected to the output of the converter 92 and connected in series with the stage 112 an auxiliary narrow-band filter 113, whose output is connected with the summator 107 via a modulator 114.

The receiver-display comprises also an auxiliary phase shifter 115, connected to the phase difference display unit 111, the output of the phase shifter 115 being connected also with the input of the phase discriminator via an electronic key 116.

The phase difference display is made as phase shifters 117, 118, 119, 120 and 121 linked through reducers 122, 123, 124 and 125, the inputs of the phase shifters 118-120 being connected, via electronic keys 126, 127, and 128, with the output of the phase shifter 115, while their outputs are combined and connected to the input of the discriminator 110 via an electronic key 129.

The input of the phase shifter 121 is connected, via an electronic key 130, with the output of the phase shifter 82, while its output, with the input of the discriminator 104. The output of phase shifter 117 is connected by means of electronic key 130' to the commutating unit 86 and the electronic key 85.

The receiver-display comprises, according to the invention, a two-channel automatic analyzer 131, consisting of analyzing unit 132 of phase shifter adjustment, analyzing unit 133 of output signal amplitude, reversible counter 134 associated with the outputs of units 132 and 133 by means of a threshold device 135 and automatic switching unit 136 of mode of operation.

All the ground stations are outfitted with the same equipment, each being able to operate as the main or as an auxiliary station when relevant switching-over of some circuits are performed, as described below.

There is next considered the operation of an auxiliary station, because in this case a greater number of circuits is under operating condition. As compared with the main station, an auxiliary station executes the searching of signals emitted by the main station and the adjusting of phase of its own signals to those received, in addition to the generation of signals with predetermined frequency and phase relationship.

Figure 1:
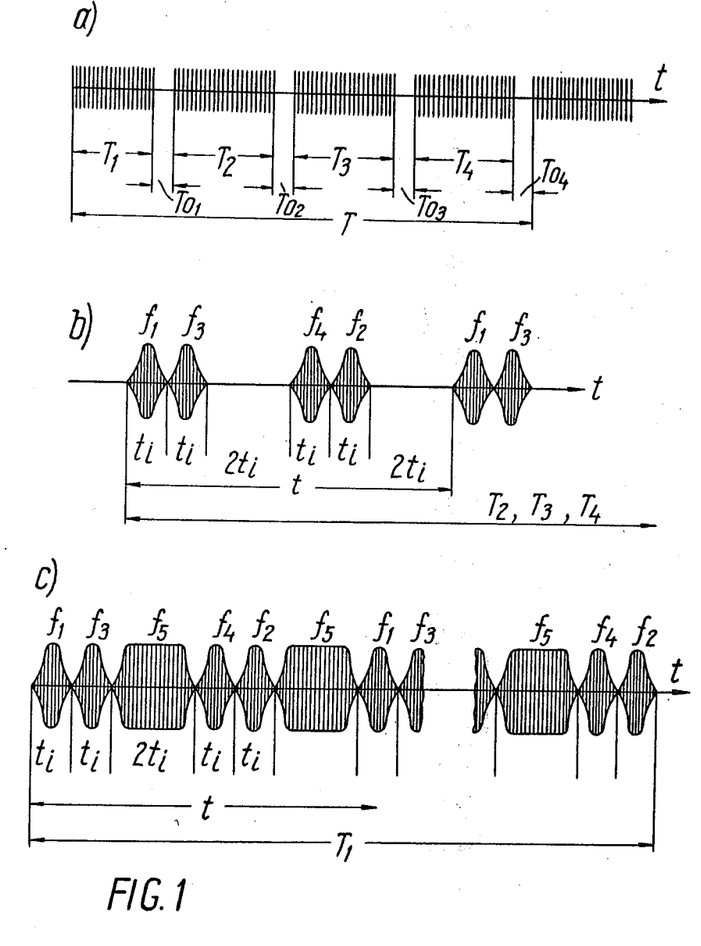

A 100 kc/s signal derived from the reference generator 1 is applied, via the phase shifter 3 and key 17 (these are replaced by key 2 in the main station), to the auxiliary frequency forming unit 26, and to the phase shifters 4, 5, 6, 7 and further to modulators 8, 9, 10, 11, which are opened by pulses with a frequency of $F = 800$ c/s supplied from the unit 27 during periods of time in accordance with FIG. 1c, namely: modulator 8 is opened with emission of frequency $f_1$ during time $t_i$, modulator 9 is opened with emission of frequency $f_3$, modulator 10 is opened with emission of frequency $f_4$ and modulator 11 is opened as frequency $f_2$ is being emitted. The signal derived from the unit 26 is fed to the input of the unit 27 via the phase shifter 29. Thus, the position in time of pulses with the travel interval $t$ corresponds to the position of the phase shifter 29.

The radio pulses obtained at the outputs of the modulators 8, 9, 10, 11 are supplied respectively to the frequency converters 12, 13, 14, 15, to which are also sent the auxiliary frequencies derived from the unit 26 through circuits 31, 32, 33, 34; by means of these frequencies are produced the pulses at carrier frequencies across the outputs of the converters 12–15 namely: from the output of the converter 12 is derived a radio pulse with carrier frequency $f_1$, from the output of the converter 13 radio pulse with carrier frequency $f_2$, from the output of the converter 14 a radio pulse with carrier frequency $f_3$, and from the output of the converter 15 a radio pulse with carrier frequency $f_4$. Then the radio pulses derived from the converters 12, 13, 14, 15 are supplied to the amplifier 19.

The amplifier 19 and the unit 27 operate only during the emission of the signals by the stations according to FIG. 1a, i.e., the radio pulses with carrier frequencies are not emitted while other signals are being received. The signals amplified by the amplifier 19 are sent to the antenna 21 via the transmitter 20.

Thus the aerial has received the signals with predetermined frequency relationship, the phases of which depend on the position of phase shifters, 4,5,6,7, while the position in time of its pulses corresponds to the position of phase shifter 29.

As it has been pointed out above, the auxiliary station effects the searching of the signal emitted by the main station. Consider the operation of the circuit for search of signal and adjustment of position in time of pulses on the envelope. Coarse and fine adjustment duties are available.

The signals derived from the antenna 21 are sent, via the attenuator 36, to the inputs of the wide-band filters 37, 38, 39, 40, each of them passing a signal with a definite carrier frequency, namely: filter 37 passes the radio pulses with carrier frequency $f_1$, which are further applied across the converter 41, to which is additionally supplied an auxiliary frequency from the unit 26 through the circuit 49, the latter frequency being used for generating a radio pulse with 100 kHz frequency at the converter output. Said radio pulses are supplied across the inputs of the gating stages 53 and 54 via an automatic gain control amplifier (not shown in the Figure) and key 45. To the gating stages 53 and 54 are supplied, in the searching duty, wide gates from the unit 74, to the input of which in the signal reception cycle from the main station, namely during the time $T_1$ and $T_3$, a signal is applied from the unit 26 via the phase shifter 70 and the key 71.

The wide gates are rectangular pulses, the width of which is equal to a half of repetition time, and which have the repetition time $t$, the result being that the gating stages 53 and 54 are opened turn by turn, and depending on the position in time of the radio pulse and of the wide early gates the signal will be either at the output of the gating stage 53 or at the output of the gating stage 54, for instance, at the output of the gating stage 53.

The signal, or more precisely, the signal plus noises obtained from the output of the gating stage 53 are applied to the input of the narrow-band filter 56, while to the input of the narrow-band filter 57 is applied only the noise obtainable from the gating stage 54. The narrow-band filters serve to improve the signal-to-noise ratio and convert the radio pulses into a continuous signal.

Thus the signal obtainable from the filter 56 is supplied to the summator 61 via the modulator 59, whereas the noise the amplitude of which is considerably smaller than the signal from the filter 56, derived from the filter 57, is applied to the summator 61 via the modulator 60. The modulators 59 and 60 are opened in turns, thereby a modulated signal is obtainable from the output of the summator 61, wherein the modulation depth depends on the position in time of the wide gates relative to the radio pulse received. The modulated signal obtainable from the summator 61 is supplied to the amplitude detector 62 which produces the mismatch signal, the value thereof being proportional to the modulation depth.

The mismatch signal from the amplitude detector 62 is applied to the phase shifter 70 via the control unit (not shown in the FIGURE), altering thereby the position of the shifter, and hence, the position in time of the wide gates relative to the radio pulse.

When the position in time of the wide gates with respect to the radio pulse is such that a portion of the pulse is applied via the gating stage 53 to the input of the filter 56, while the other portion is applied via the gating stage 54 to the input of the filter 57 and the amplitudes of continuous signals proportional to the portions of the divided pulse obtainable from the outputs of the modulator are equal (this state corresponding to absence of modulation) across the output of the amplitude detector 62 the mismatch signal becomes equal to zero and the tuning of the phase shifter 70 is completed.

The tuning of the radio pulses relative to position in time during their emission is effected similarly, excepting the fact that the signal is applied to the input of the phase shifter unit 74 from the phase shifter 70 through the phase shifter 72 and key 73, the mismatch signal derived from the amplitude detector 62 is supplied through the control unit (not shown in the FIGURE) to the phase shifter 72, while the voltage obtained from the second output of the phase shifter 72 is applied to the phase shifter 29, which determines the position in time of the emitted radio pulses.

The adjustment is ended when the coincidence between the position of phase shifter 72 and the reading of reference phase shifter 74' has reached. In this case, the position in time of radiated pulses will be different from that of pulses received from the main station by a magnitude preset at the reference phase shifter 74'.

Once the coarse adjustment of phase shifter 70, 72, 29 by means of wide gates has been effected, the narrow gates are fed to the gating stages 53 and 54, the duration of each narrow gate is equal to a half of the duration of one pulse, i.e., about 75 $\mu$sec and which has the repetition frequency $F = 800c/s$ and are passed one after another in such a way that the second narrow gate terminates at the instant of beginning of the second wide date.

The signal-to-noise ratio is hereby improved and the adjustment accuracy of the phase shifters 29, 70, 72 is increased, since only a portion containing the radio pulse is considered instead of the whole emission period.

The remaining circuits operate in the manner similar to that effected during the coarse adjustment.

In the main station the reference phase shifter 137 is disconnected, the phase shifter 72 serving for checking, while the number of the circuits similar to the phase shifter 72 and key 73, included between the phase shifter 70 and unit 74 is defined by the number of auxiliary stations, in this case there are two stations (the second circuit is not shown in the FIGURE).

Following the envelope adjustment, signal phases of carrier frquencies are tuned in order to provide for definite phase ratios between the signals of each station.

First the phase of signal at the frequency, which serves for defining accurately the position, in this case frequency $f_1$, is adjusted to the phase of signal received from another station (this procedure is not performed at the main station), and then the phases of remaining carrier frequencies $f_2$, $f_3$ and $f_4$ are adjusted with reference to the phase of signal at frequency $f_1$.

Consider the operation of the circuit for adjusting the phases of signals at frequency $f_1$.

As has been stated above, the radio pulse with $f_1$ frequency after having passed the attenuator 36, filter 37, converter 41, key 45 and obtaining 100 kHz frequency is applied to the gating stage 54, whereto is supplied a gate of a duration equal to that of the radio pulse $t_i = 150/\mu$sec from the unit 74, while the position in time after the fine tuning according to the envelope coincides with the time of reception of the radio pulse. The radio pulse derived from the gating stage, whereat the surface ray has been separated from that reflected by the ionosphere due to the gating action, is supplied to the narrow-band filter 57 and is converted into a continuous signal with a phase of frequency $f_1$ and is further applied to the input of the phase discriminator 24 to the second input of this phase discriminator 24, via the key 22 opened for the time of reception of signals from the mains station, i.e., during the period of time $T_3$, is fed a voltage derived from the phase shifter 3 and key 17. The mismatch voltage from the discriminator 24 is supplied to the control unit (not shown in the FIG- URE) of the phase shifter 3, which alters its position until the mismatch voltage becomes zero.

Then the emitted signal is being received. The signal with carrier frequency $f_1$ is converted and enters the discriminator 24 in the way described above, while the position in time of the gate is determined by the position of the phase shifter 72. Generally, the gate is not obligatory, since when the station emits signals there is no ray reflected by the ionosphere.

To the second input of the discriminator 24 the voltage is supplied from the phase shifter 3 via key 17, reference phase shifter 23 and key 25. The reference phase shifter 23 is set manually and allows for introducing the fixed shift between the phases of signals of the main and auxiliary stations.

The mismatch voltage from the discriminator 24 is supplied to the phase shifter 4, which determines the emitted signal phase on the carrier frequency $f_1$ and changes its position until the mismatch voltage becomes equal to zero.

Hereat all the phase shifts in the channels will be compensated for, while the emission signal phase of the auxiliary station at the antenna input will differ from the phase of the signal received from the main station by a value preset on the reference phase shifter 23. Here, the control over the phase shifter 4 on the main station is switched off, key 2 is cut in instead of the key 17, while the phase shifters no adjustment of phase of signals radiated at frequency $f_1$ to the phase of those received from other station is made.

In the emission cycle, namely during the period of time $T_3$ in the main station and during $T_2$ and $T_4$ in the auxiliary stations the phases of carrier frequency signals are being adjusted in predetermined phase relationship to harmonic components of narrow pulses passing with the repetition frequency, multiple of intervals of all carrier frequencies, and having the initial phase determined by the pulse parameters; first, the adjustment of the harmonic component at frequency $f_1$ to the phase of signal at carrier frequency $f_1$ and then that of phase of signal at carrier frequencies $f_2, f_3, f_4$ to the phase of components to these frquencies.

A signal derived from the key 17 (or from the key 2 in the main station) is supplied, via the phase shifter 75, to the reference frequency forming unit 76, whereto is also applied a signal from the unit 26.

A signal derived from the unit 76 is supplied, via the modulator 78, which is being opened for the time when the main signal is not emitted, this time being precisely known after the fine envelope tuning is effected, to the reference pulse forming unit 79, and then through the attenuator 36 and common point 35 to the wide-band filters 37, 38, 39, 40.

Through the wide-band filter 37 is passed a radio pulse with frequency $f_1$, while from the spectrum of narrow pulses is also cut out a harmonic component with a frequency $f_1$, the radio pulse and the reference frequency $f_1$ being separated in time.

These signals are converted in the converter into 100 kHz frequency, are passed through the key 45 and are applied to the gating stages 54 and 55. The gating stage 54 is opened at the time of reception of the radio pulse, while the stage 55 is opened at the time of reception of the reference frequency.

The gating voltage is supplied by the unit 74, while the time of reception of the radio pulses and the reference frequency is known after a precise envelope tuning has been effected.

Having passed through the gating stage 54, the radio pulse is applied to the narrow-band filter 57, converted into a continuous signal with a duration equal to the cycle $T_2, T_3$ or $T_4$ and is then supplied to the first input of the phase discriminator 24, while the reference frequency from the gating stage 55 is applied to the narrow-band filter 58, wherein it is converted into a continuous signal and is further applied to the second input of the discriminator 24 through the key 63.

The mismatch voltage derived from the discriminator 24 is supplied to the phase shifter 75.

In the ensuing cycle the modulator 78 becomes opened during periods of time not occupied by emission of a radio pulse with $f_2$ frequency, the pulse and reference pulses being applied to the input of the wide-band filter 38, wherein a component with $f_2$ frequency is separated from of reference pulses.

Further, the radio pulses at carrier frequency $f_2$ and the pulses at reference frequency $f_2$ and applied to the converter 42, whereto is fed an auxiliary frequency through circuit 50; here the frequencies $f_2$ are converted into 100 c/s frequency and sent via the key 46 (the key 45 is closed in this cycle) to the gating stages 54 and 55 which become conducting in this cycle in accordance with the time of reception of the radio pulse and the reference frequency, known exactly beforehand, then the signals are being separated, the radio pulse being sent to the narrow-band filter 57, is converted into a continuous signal and then applied to the discriminator 24, while the reference frequency is sent to the second input of the discriminator 24 via the narrow-band filter 58, reference phase shifter 64 and key 67. The mismatch voltage from the discriminator 24 is supplied to the phase shifter 5, whose position defines the phase of the carrier frequency $f_2$.

During the subsequent cycles as the carrier frequency phases $f_3$ and $f_4$ are being tuned, the radio pulses and the reference pulses are passed through the same channel, i.e., the filter 39, converter 43, whereto is sent an auxiliary frequency via the circuit 51, key 47, in case of receiving $f_3$ frequencies, and through filter 40, converter 44, whereto is supplied an auxiliary frequency via the circuit 52, key 48, in case of receiving $f_4$ frequency, and then the radio pulses are applied to the input of the discriminator 24 via the gating stage 54 and narrow-band filter 57, while the reference frequency is supplied to the second input of the discriminator 24 via the gating stage 55, narrow-band filter 58, phase shifter 65, key 68 (in case of receiving $f_3$ frequencies) or via the phase shifter 66 and key 69 (in case of receiving $f_4$ frequencies).

The mismatch voltage derived from the discriminator 24 is applied to the phase shifter 6 in the frequency $f_3$ tuning cycle and to phase shifter 7 in the frequency $f_4$ tuning cycle, the positions of which determine the phases of the carrier frequencies $f_3$ and $f_4$. The reference phase shifters 64, 65, 66 are set manually.

As a result, on completion of tuning, the phases of signals at carrier frequencies in the aerial will be associated in the same phase relationships, taking into account the position of the reference phase shifters, as harmonic components of narrow pulses following with a repetition frequency which is multiple of carrier frequencies, owing to the passage of radio pulses and the components of reference pulses first through the common circuits (for instance, filter 37, converter 41 and key 45, if the signals at frequency $f_1$ are received) and then the passage of radio pulses through the circuit: gating stage 54, narrow-band filter 57' to the input of discriminator 24 — and the reference frequencies through the circuit: gating stage 55, narrow-band filter 58, reference phase shifters 64,65,66 and keys 63,67,68,69, — all the initial phases and phase instability of the receiving channels, forming channels of carrier and auxiliary frequencies will be compensated.

The ambiguity of adjustment of the phase at carrier frequencies is removed, for example, using one of control devices in the following manner: a command derived from the unit 77 passes to the unit 76 and turns the phase shifter mounted in the latter unit by an integer of reference frequency cycles, resulting in that the phase relationships of the harmonic components of reference pulses are varied with reference to the initial pulses in proportion to the relationship between the difference of frequencies $f_2 - f_1, f_3 - f_1, f_4 - f_1$ and frequency $f_1$, while due to the adjustment of phase shifters 5,6,7 there is effected the variation of the phase of carrier frequencies $f_2, f_3, f_4$ in the aerial according to the same law.

The control and commutation unit 30 serves for setting the sequence of operation of the keys and elements of the circuit according to the time diagram presented in FIG. 1a, the time of its functioning on the auxiliary stations being determined by the time of reception of a signal with carrier frequency $f_5$ (FIG. 1c), which serves as a synchronizing signal for the commutation units of the auxiliary stations.

The commutator synchronizing circuit according to a continuous signal, due to gating of the signal through the narrow-band filter can be embodied in different ways and is not therefore disclosed in this specification.

The periodicity of adjusting cycles of the envelope and phases of carrier frequencies constitutes the general cycle of the ground station determined by operation of the unit 30, which is repeated periodically in the course of operation of the station in the system, owing to which is constantly and automatically performed the compensation of changes in the phase shifts in the channels, thereby excluding the necessity to insure high phase stability of the channels in time.

On reception of the signals emitted by the stations, the receiver-display determines the time of emission of each station $T_1$, $T_2$, $T_3$ and $T_4$ basing on the synchronizing signal with carrier frequency $f_5$, searches the signals within the long trains emitted by each station, separates the signals propagated over the earth surface from those reflected by the ionosphere and determines the location of the object due to phase differences on $f_1$ frequency, performing the ambiguity removal due to phase difference on beat frequencies $f_4 - f_1, f_3 - f_1, f_2 - f_1$ and the frequency of envelope of pulses F.

The search of the signals, removal of ambiguity and determination of position of the object are performed in sucsession, the receiver-display being provided with several modes of operation, i.e., "Coarse," "Fine" used for searching the signal and removing ambiguity according to F frequency, "C4," "C3," "C2" duties used for coarse tuning of the reference generator to beat frequencies, "4," "3," "2" duties used for tuning the reference generator to carrier frequency $f_1$ and removing ambiguity of a moving object and "I" duty for accurate locating the position of the object.

The keys and other circuit components are switched on during one of the above duties with the help of unit 136 of automatic switching over of duties, while the reception of long trains from each station is effected in accordance with the time diagram presented in FIG. 1a by a commutator (not shown in the FIGURE), which is synchronized with a long train with $f_5$ frequency using one of the known methods.

Consider the receiver-display operation when receiving the signals emitted by the main and one of auxiliary stations.

At the beginning of work all the keys of the receiver-display are switched on in accordance with the "Coarse" search duty, the signals from the receiving antenna 87 being applied to wide-band filters 88, 89, 90, 91. The radio pulse derived from the filter 88 is supplied to the frequency converter 92, to the second input of which is sent auxiliary frequency from the unit 83, to the input of which is supplied, in turn, the frequency from the reference generator 80 via the phase shifter 82.

The radio pulse derived from the converter 92 with 100 Kc/s frequency is applied to the gating stages 100 and 112, to which are also applied wide gates in the form of rectangular pulses with a width equal to half of a repetition interval, which have a 180° shift, relative to one another, and a repetition frequency F, derived from the unit 86, to the input of the latter being sent frequency F from the auxiliary frequency unit 83 via the phase shifter 84 and key 9 during reception of the signals of the main station, and via the phase shifter 84, phase shifter 117 and key 138 in the during reception of the signals of the auxiliary station.

In result, the gating stages 100 and 112 are opened in turn during the entire period of the pulse emission, causing a signal to be produced at the output of the gating stage 100 or 112, for instance, at the output of the gating stage 100, depending on the position in time of the radio pulse and wide gates. The signal, to say exactly, the signal and the noise from the output of the gating stage are applied to the input of the narrow-band filter 102, whilst the noise from the gating stage 112 is passed to the input of the narrow-band filter 113.

The narrow-band filters improve the signal-to-noise ratio and convert the radio pulses into a continuous signal. Thus, the signal from the filter 102 via the modulator 106 is applied to the summator 107, while the noise, the amplitude of which is much more less than the signal derived from the filter 102, is supplied from the filter 113 to the summator 107 via the modulator 114. The modulators are opened in turns, therefore, at the output of the summator 107 a modulated signal is obtained, the depth of modulation depending on the position in time of the wide gates relative to the radio pulse received. The modulated signal from the summator 107 is applied to the amplitude detector 108, which generates a mismatch signal, the value of which is proportional to the modulation depth.

The mismatch signal derived from the amplitude detector 108 is applied to the phase shifter 84 and to phase shifters 117–121 of the phase difference display unit 111, altering their positions and hence the position in time of the wide gates with relation to the radio pulse. When the position in time of the wide gates relative to the radio pulse is such that a portion of the radio pulse is supplied, via the gating stage 100, to the input of the filter 102, while the other portion is applied, via the gating stage 112, to the input of the filter 113 and in case the amplitudes of continuous signals proportional to the areas of the divided radio pulse become equal at the outputs of the modulators, this state corresponding to absence of the modulation, the mismatch signal derived from the output of the amplitude detector 108 becomes equal to zero and the tuning of the phase shifters 84 and 117 is considered completed.

At the same time to the inputs of the signal amplitude analyzer unit 133 and to the phase shifter matching analyzer 132 are applied: a signal derived from the narrow-band filter 102 and a signal from the output of the amplitude detector 108.

The signals from the units 133 and 132 are supplied to the threshold device 135. Depending on the signal amplitude and the value of mismatch voltage available at the preset threshold the unit 135 produces pulses which are applied to the bidirectional counter 134 to the second input of which a frequency is supplied from the unit 83, which determines the preset probability of proper position finding, and in case the frequency applied from the device 135 is higher, the bidirectional counter 134 sends a pulse to the unit 136 to shift over to the next operating mode.

The next mode of operation is the fine search, similar to the coarse search excepting that to the gating stages 100 and 112 are applied narrow gates from the unit 86, the duration of each being equal to half of the duration of the radio pulse, i.e., approximately to 75 $\mu$sec, and which possess the same repetition frequency and follow one after another in such a way that the second narrow gate ends when the second wide gate had begun.

Owing to this, the signal-to-noise ratio is improved and the accuracy of tuning of the phase shifters 84 and 117 is enhanced, since only that portion of the period which has the radio pulse is processed, instead of the whole cycle of travel. The phase shifter 117, incorporated in the phase difference display unit 111 becomes shifted to an angle proportional to the difference in the time of the radio pulses receptions emitted by the main and auxiliary stations, while via the reducers 122, 123, 124, 125 the remaining phase shifters 118–121 of the phase difference display unit 111 become turned, also does the pointer of the display (not shown in the FIGURE), on the scale of which will be shown the reading corresponding to coarse position finding.

Following the tuning of the phase shifters the unit 131 operating in the same way as in the coarse duty sends a command to the unit 136 in order to commutate to the "C4" duty.

In case during the operation in the fine duty the signals of one of the stations fade out or erroneous tuning takes place, the unit 131 sends a command to commutate to the coarse duty. This holds true in case of the receiver-display operation in any subsequent duty.

In the "C4" duty the tuning according to the envelope is effected in the same way as in the fine duty. Besides, during the reception time of the main station the signal derived from the narrow-band filter 102 is applied to the input of the phase discriminator 104.

The radio pulse with $f_4$ frequency derived from the antenna 87 is gated, via the wide-band filter 89 and frequency converter 93, whereto is applied auxiliary frequency from the unit 83, being also converted into 100 kHz frequency, through the gating stage 101, the latter stage separating the signal propagated over the earth surface from that reflected by the ionosphere and the time of arrival of which is known after the fine duty is completed, and then the pulse is supplied to the input of the narrow-band filter 103 wherein it is converted into a continuous signal, and is applied to the second input of the discriminator 104 via the key 105. The mismatch voltage derived from the discriminator 104 is supplied to the phase shifter 82 and variable capacitor 81 which serve for changing the frequency of the reference generator 80 and in turn for changing the frequency and phase ratios of the auxiliary frequencies applied to the converters 92 and 93.

The tuning is completed when the frequency and phase ratios of the auxiliary frequencies correspond to those of the signals with $f_4$ and $f_1$ frequencies received from the main station, namely, to beat frequencies $f_4 - f_1$.

To the input of the unit 131 in this duty are applied the signals derived from the narrow-band filters 102 and 103 and the signals from the unit 108 and discriminator 104. On completion of tuning the unit 134 sends a pulse to the unit 136 in order to commutate to the subsequent duty, namely, to "C3." In this duty the key 97 switches on instead of the key 96, thus providing for sending a radio pulse to the input of the gating stage 101, corresponding to the $f_3$ frequency, passed from the antenna 87 via the filter 90 and converter 94, while to the second input of the gating stage 101 is applied a gate derived from the unit 86 which opens the gating stage 101 for the period of the radio pulse reception.

The remaining keys and elements operate in the same way as in the "C4" duty, excepting that the reference generator 80 is tuned in accordance with frequency and phase ratios with frequencies $f_3$ and $f_1$, namely, with beat frequencies $f_3 - f_1$, thus increasing the tuning accuracy.

When commutating to the "C2" duty, key 98 is switched on instead of the key 97, following which a radio pulse, corresponding to the $f_2$ frequency, is applied to the input of the gating stage 101, passed through the filter 91 and converter 95, while to the second input of the gating stage 101 is applied a gate from the unit 86, which opens the gating stage 101 for the period of the radio pulse reception.

Hereby the tuning of the reference generator 80 is effected according to the frequency equivalent to the beat frequencies $f_2 - f_1$, thus enhancing the tuning accuracy.

Then the unit 136 commutates the receiver-display into the "4" duty. In this duty (as well as in duties 3, 2, 1) the reference generator 80 becomes tuned to $f_1$ frequency as follows.

The radio pulse with $f_1$ frequency in the reception time of the main station is supplied from the antenna 87 via the wide-band filter 88 and converter 92 to the gating stage 100, to the second input of which is applied a gate from the unit 86, which opens the gating stage for the period of the radio pulse reception propagated over the earth surface, the position in time of which is fixed by the position of the phase shifter 84, the tuning of the latter being completed in the "4" duty, while the overshoot of the phase due to alteration of the distance to the main station is compensated for by the tuning of the phase shifter 82.

The radio pulse derived from the gating stage 100 is further applied to the narrow-band filter 102, then is converted into a continuous signal and impressed across the input of the phase discriminator 104, to the second input of which is supplied 100 kHz frequency through the phase shifter 82 and key 109.

The mismatch voltage derived from the discriminator 104 is supplied to the phase shifter 82 and variable capacitor 81.

At the same time, the signal derived from the filter 102 is sent to the phase shifter 115 and unit 133. Further, i.e., in the "3, 2, 1" duties the circuit consisting of the antenna 87, filter 88, converter 92, gating stage 100, filter 102, phase shifter 115 and unit 133 is operating.

The signal derived from the phase shifter 115 during the time of signal reception of the main station is gated through the key 116 and applied to the input of the phase discriminator 110, whereas during the time of signal reception of the auxiliary station, the signal passes through the phase shifter 115, keys 126-129 and phase shifters 118-121 of the phase difference display 111, namely, in the "4" duty, through the key, 126, and phase shifter 118, in the "3" duty, through the key 127 and phase shifter 119, and in the "2" duty, through the key 128 and phase shifter 120.

The key 129 switches on also during the time of signal reception of the auxiliary station in the "4," "3," "2" duties.

To the second input of the phase discriminator 110 is applied a signal sent by the narrow-band filter 103. The radio pulses from the antenna 87 are passed through the common point 99 in the "4" duty via the filter 89, converter 93, and key 96, while in the "3" duty, via the filter 90, converter 94, key 97, and in the "2" duty, via the filter 91, converter 95 and key 98. From the common point 99 converted signals are passed to the input of the narrow-band filter 103 via the gating stage 101, which is opened by the gate derived from the unit 86 for the period of reception of relevant radio pulse.

The mismatch voltage derived from the discriminator 110 is supplied to the phase shifter 115 and phase shifters 117-121 of the phase difference unit 111 and controls the phase shifters 118, 119, 120 through which is passed the signal in the "4," "3," "2," duties, the phase shifter 118 connected via the reducer 122 with the phase shifter 117 and the position of which had been pointed out in the fine duty, determines the position of the phase shifter 119 in the "4" duty via the reducer 123, then the phase shifter 119 determines the position of the phase shifter 120 via the reducer 124 in the "3" duty, whilst in the "2" duty the phase shifter 120 determines the position of the phase shifter 121 via the reducer 125. The signals are applied to the inputs of the phase discriminator 110 from the narrow-band filters 102 and 103, across which are available continuous signals in the "4," "3," "2" duties, corresponding to $f_4, f_3, f_2$ and $f_1$ frequencies and the phase shifters of the phase difference display unit 111 are tuned similarly to the tuning effected on beat frequencies $f_4 - f_1, f_3 - f_1, f_2 - f_1$ although the beat frequencies proper do not exist.

Thus in the "4," "3," "2" duties the ambiguity of the position of the phase shifter 121 is removed.

In the "1" duty to the input of the phase discriminator 104 is applied a signal from the filter 102, corresponding to the carrier frequency $f_1$, whilst to the second input are applied signals derived from the reference generator 80, the signal in the time of reception by the main station being gated through the phase shifter 82 and key 109, whereas in the time of reception by the auxiliary station, through the phase shifter 82, key 130 and phase shifter 121.

The mismatch voltage derived from the discriminator 104 is supplied to the phase shifter 82 and phase shifter 121, the latter being connected with the scale of the phase difference display unit 111, according to which the readings are taken for determining the exact position of the object.

Two readings are necessary for locating the object, for which purpose one more phase difference display unit (not shown in the FIGURE) is available in the receiver-display which is connected in parallel to the latter and the keys thereof operating in the channels of signal reception by the other auxiliary station.

What is claimed is:

1. A method for the unambiguous detecting of the position of a moving object relative to at least three stationary ground stations of a radio navigation system, one station thereof being the main station, said method comprising generating at said stations and transmitting therefrom signals alternately in the form of long trains comprising a multitude of successive groups of radio pulses with various carrier frequencies and a repetition interval, which depends only on the delay time of the radio pulses reflected by the ionosphere, the repetition frequency of transmitted radio pulses being equal to the frequency at which the most coarse determination of the position of a moving object is effected, the phases of signals on various carrier frequencies being in constant relationship upon transmission; the main station being caused to transmit additionally a synchronizing signal within the spaces between the radio pulses of fundamental signals which carry phase information while the long pulse train of synchronizing signal is being transmitted; said synchronizing signal determining the sequence of transmission of said trains by the stations in a general transmission cycle, said radio pulses generating an electromagnetic field with predetermined frequency and phase relationships; said long trains, as well as the signals reflected by the ionosphere, being received by a receiver-display which determines the sequence of transmissions of pulse trains by the stations in the general cycle resorting to the synchronizing signal, performs a search for radio pulses within each long train and division of signals into waves propagated over the earth surface and waves reflected by the ionosphere; said receiver-display then converting the radio pulses of surface waves with various carrier frequencies into undamped oscillations having the same intermediate frequency and a duration equal to that of the long trains, which corresponds to those transmitted by said stations, whereas the relative phases of said oscillations depending on the phase of transmitted signals; said receiver-display executing also the measure of difference in phase between said I.F. oscillations within each long train, said difference in phase being equivalent to the phase of signals at the beat frequency of two carrier frequencies; said receiver-display then effecting the measurements of the difference in phase of radio pulses at repetition frequency and the difference between said differences in phase of I.F. oscillations, the two being obtained within different long trains for removing any possible ambiguity and defining accurately the position of a moving object by using the difference in phase between said I.F. oscillations obtained on one of the carrier frequencies within various of the long trains, determining according to said synchronizing signal the sequence of transmission of pulse trains by the station in the general cycle, then in the range of each long train of radio pulses are being searched, said signals being divided into signals propagating over the earth surface and signals reflected by the ionosphere, the signal phase on one of the carrier freequencies measured, the phase difference of two signals determined on one of the carrier frequencies, the difference being used for detecting the exact position of a moving object, signal phases being compared on beat frequencies and radio pulse repetition frequency, the comparison result being used for removing ambiguity of position of a moving object.

2. A ground station for a radio navigation system, comprising a reference generator; an adjusting phase shifter connected to said reference generator; a first auxiliary frequency forming unit connected to said phase shifter; a first group of modulators, each being connected to the output of said first auxiliary frequencies forming unit; a transmitter connected to the outputs of said modulators; a receiving channel of the ground station, comprising; a phase discriminator having two inputs and an output; the output of the phase discriminator being connected to said adjusting phase shifter; a reference phase shifter connected to the output of said adjusting phase shifter; the output of said reference phase shifter being connected to the input of said phase discriminator; a receiving-tramsmitting antenna; several wide-band filters connected to said receiving-transmitting antenna; gating stages, each being connected to one of said wide-band filters; narrow-band filters which convert the radio pulses into a continuous signal having a duration equal to that of the pulse train, the input of each of the filters being connected to the output of relevant said gating stages; electronic keys, each having an input and an output; said input of each electronic key being connected to the output of the associated narrow-band filter; said outputs of all electronic keys being connected to second input of the phase discriminator.

3. A ground station as claimed in claim 2, wherein said receiving channel comprises a phase shifter, the input thereof being connected to the output of said adjusting phase shifter; a reference frequency forming unit connected to the output of said phase shifter of the receiving channel; a modulator connected to the output of said reference frequency forming unit; a reference frequency forming unit connected to the output of said modulator of the receiving channel; an output of said reference frequency forming unit being connected to the inputs of said wide-band filters.

4. A receiver-display of a radio navigation system, comprising a receiving antenna receiving pulses emitted by the ground stations of the radio navigation system; a reference generator; adjusting phase shifters having inputs connected to the outputs of said reference generator; two parallel circuits, each consisting of a series connected gating stage and narrow-band filter; said narrow-band filters forming a first group of filters; a second group of wide-band filters, each connected to said receiving antenna; the number of said wide-band filters in the second group being equal to the number of carrier frequencies of a radio navigation system; frequency converters, each having an input and an output; said input of each of the converters being connected to one of said wide-band filter of the second group, said output of the first of said converters being connected to the input of said gating stage of the first circuit; a first group of electronic keys, each having an input and an output; said output of each of the remaining converters being connected to associated of said inputs of the electronic keys; said outputs of all of said electronic keys being combined and connected to the input of said gating stage of the second circuit; an auxiliary phase shifter having an input and an output; said input of said auxiliary phase shifter being connected to the output of said narrow-band filter of the first circuit; a phase difference display unit comprising phase shifters; the input of said phase difference display unit being connected to said output of said auxiliary phase shifter; an auxiliary frequency forming unit, having an input and an output; said input of said auxiliary frequency forming unit being connected to the output of said adjusting phase shifter; said output of said auxiliary frequency forming unit being connected to the inputs of said converters; a phase discriminator having two inputs and an output; the first input of said phase discriminator being connected to the output of said narrow-band filter of the second circuit; a second group of electronic keys, each having an input and an output; said second input of said phase discriminator being connected to said output of auxiliary phase shifter and to said phase shifters of the phase difference display unit; said output of said phase discriminator being connected to said auxiliary phase shifter and to said phase shifters of the phase difference display unit.

5. A receiver-display as claimed in claim 4, comprising a third gating stage connected to the output of said first frequency converter; a third narrow-band filter connected to the output of said third gating stage; a modulator connected to the output of said third narrow-band filter; a second modulator, the input thereof being connected to the output of said first circuit; a summator having two inputs and an output; said first input of the summator being connected to the output of said first modulator; said second input of the summator being connected to the output of said second modulator; an amplitude detector connected to said summator and said auxiliary phase shifter and said phase difference display unit; the second output of said auxiliary frequency forming unit being connected to the input of said auxiliary phase shifter and to the input of said phase difference display unit; a third group of electronic keys, having inputs are connected to the output of said auxiliary phase shifter and to said second output of phase difference display unit; said gating stages being connected to said third group of electronic keys.

6. A receiver-display as claimed in claim 4, comprising a two-channel automatic analyzer of phase shifter operation having inputs thereof being connected to the outputs of said narrow-band filters and to the outputs of said phase discriminator, and an operating mode automatic switching unit for the receiver-display connected to the output of said two-channel automatic analyzer.

7. A receiver-display as claimed in claim 5, comprising a two-channel automatic analyzer of phase shifter operation having inputs connected to the outputs of said narrow-band filters and to the output of said amplitude detector, and an operating mode automatic switching unit of the receiver-display connected to the output of said two-channel automatic analyzer.

8. A receiver-display as claimed in claim 5, comprising a two-channel automatic analyzer of phase shifter operation having inputs connected to the outputs of said narrow-band filters, the outputs of said phase discriminator and/or the output of said amplitude detector, and an operating mode automatic switching unit of the receiver-display connected to the output of said two-channel automatic analyzer.

9. A receiver-display as claimed in claim 4, wherein said phase difference display comprises a reducer, by means of which said phase shifters of the display unit are connected in series.

10. A method for the unamibiguous detecting of the position of a moving object relative to at least three stationary ground stations of a radio navigation system, one station being the main station, said method comprising generating at said stations and transmitting therefrom signals alternatively in the form of long trains comprising a multitude of successive groups of radio pulses with various carrier frequencies and repetition intervals, which depend only on the delay time of radio pulses reflected by the ionosphere, the repetition frequency of the transmitted radio pulses being equal to the frequency at which the most coarse determination of the position of a moving object is effected, the phases of the signals on various carrier frequencies being in constant relationship at the output of the transmitting means;

transmitting additionally from the main station a synchronizing signal within the spaces between the radio pulses of fundamental signals which carry phase information, while said long pulse train is being transmitted; said synchronizing signal determining the sequence of transmission of said long pulse trains by the stations in a general transmission cycle, said radio pulses generating an electromagnetic field with predetermined frequency and phase relationships, said long trains, as well as the signals reflected by the ionosphere being received by a receiver-display;

determining by means of the receiver-display the sequence of transmissions of long pulse trains from the stations in a general transmission cycle resorting to the synchronizing signal and searching for radio pulses within each long train and dividing signals into waves propagated over the earth surface and waves reflected by the ionosphere;

converting by means of said receiver-display the radio pulses of surface waves with various carrier frequencies into undamped oscillations having the same intermediate frequency and a duration equal to that of the long pulse trains, which corresponds to those transmitted by said stations, whereas the relative phases of said I.F. oscillations depends on the phase of transmitted signals;

executing by means of said receiver-display the measure of difference in phase between said I.F. oscillations within each long pulse train, said difference in phase being equivalent to the phase of signals at the beat frequency of two carrier frequencies; and effecting by means of said receiver-display the measurements of the difference in phase of radio pulses at repetition frequency and the difference between said differences in phase of I.F. oscillations, the two being obtained within different long pulse trains, for removing any possible ambiguity and defining accurately the position of the moving object by using the difference in phase between said I.F. oscillations obtained on one of the carrier frequencies within various long pulse trains.

* * * * *